(12) United States Patent
St. Germain

(10) Patent No.: US 7,913,445 B2
(45) Date of Patent: Mar. 29, 2011

(54) ADJUSTABLE BUOYANCY FISHING BOBBER SYSTEM

(76) Inventor: Darin St. Germain, Gilbert, IA (US)

( * ) Notice: Subject to any disclaimer, the term of this patent is extended or adjusted under 35 U.S.C. 154(b) by 667 days.

(21) Appl. No.: 11/966,483

(22) Filed: Dec. 28, 2007

(65) Prior Publication Data

US 2009/0165357 A1     Jul. 2, 2009

(51) Int. Cl.
*A01K 93/00* (2006.01)
*A01K 91/00* (2006.01)

(52) U.S. Cl. ...................................... 43/43.14; 43/42.22
(58) Field of Classification Search ................ 43/43.14, 43/42.22, 44.98, 44.87, 42.35, 44.9, 44.91
See application file for complete search history.

(56) References Cited

U.S. PATENT DOCUMENTS

| | | | |
|---|---|---|---|
| 3,597,871 A * | 8/1971 | Hansen | 43/43.14 |
| 3,664,053 A * | 5/1972 | Beverly | 43/43.14 |
| 3,747,257 A | 7/1973 | Olsen | |
| 3,757,453 A | 9/1973 | Therres | |
| 4,090,318 A | 5/1978 | Webster | |
| 4,461,114 A | 7/1984 | Riead | |
| 4,817,326 A | 4/1989 | Benjestorf | |
| 5,456,041 A | 10/1995 | Schoeberlein | |
| 6,192,620 B1 | 2/2001 | Eckenroth | |
| 6,612,066 B1 | 9/2003 | James | |
| 6,763,973 B1 * | 7/2004 | Hudkins | 222/1 |
| 6,836,997 B2 | 1/2005 | Cramsey | |

* cited by examiner

*Primary Examiner* — Joshua J Michener
(74) *Attorney, Agent, or Firm* — Neustel Law Offices

(57) ABSTRACT

An adjustable buoyancy fishing bobber system for efficiently increasing or decreasing the buoyancy of a bobber to match the particular combined weight of the fishing line, lure and bait being currently utilized. The adjustable buoyancy fishing bobber system generally includes a casing including a first portion and a second portion, wherein the first portion extends from the second portion, wherein the casing includes a chamber formed within the first portion and the second portion. Adjusting the first portion with respect to the second portion adjusts a volume of air within the casing. A vent including a channel extends from the casing, wherein the channel extends through vent and fluidly connects to the chamber of the casing to allow the air from within the chamber to escape or enter within the chamber during adjusting.

19 Claims, 14 Drawing Sheets

ADJUSTABLE BUOYANCY FISHING BOBBER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to bobbers and more specifically it relates to an adjustable buoyancy fishing bobber system for efficiently increasing or decreasing the buoyancy of a bobber to match the particular combined weight of the fishing line, lure and bait being currently utilized.

2. Description of the Related Art

Any discussion of the related art throughout the specification should in no way be considered as an admission that such related art is widely known or forms part of common general knowledge in the field.

Fishing bobbers have been in use for years. Generally, fishing bobbers are utilized by fisherman to indicate when a fish "strikes" the bait upon the hook, wherein the fishing bobber is moved (i.e. pulled down) with the bait by the fish. Fishing bobbers are generally manufactured in various sizes and to various buoyancy forces.

The various buoyancy forces are matched up with a particular combined weight of a fishing line, lure, bait, etc. so that the bobber stays slightly above the water line when fishing in a normal manner and no fish are "striking" the bait. The bobber is also generally ensured to not be too buoyant so that when a fish does "strike" the bait, the bobber is pulled down below the water line to notify the fisherman that the bait is being pursued by at least one fish.

It can be difficult to match the particular buoyancy of the bobber with the combined weight of the utilized fishing gear (i.e. fishing line, lure, bait, etc.) thus requiring the fisherman to purchase multiple bobbers which may be costly. It may also be time consuming to find the correct bobber to utilize each time when changing fishing line, lures or bait thus cutting down on the amount of time utilized for fishing. Because of the inherent problems with the related art, there is a need for a new and improved adjustable buoyancy fishing bobber system for efficiently increasing or decreasing the buoyancy of a bobber to match the particular combined weight of the fishing line, lure and bait being currently utilized.

BRIEF SUMMARY OF THE INVENTION

The general purpose of the present invention is to provide an adjustable buoyancy fishing bobber system that has many of the advantages of the bobbers mentioned heretofore. The invention generally relates to a bobber which includes a casing including a first portion and a second portion, wherein the first portion extends from the second portion, wherein the casing includes a chamber formed within the first portion and the second portion. Adjusting the first portion with respect to the second portion adjusts a volume of air within the casing. A vent including a channel extends from the casing, wherein the channel extends through vent and fluidly connects to the chamber of the casing to allow the air from within the chamber to escape or enter within the chamber during adjusting.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide an adjustable buoyancy fishing bobber system for efficiently increasing or decreasing the buoyancy of a bobber to match the particular combined weight of the fishing line, lure and bait being currently utilized.

Another object is to provide an adjustable buoyancy fishing bobber system that allows the bobber to adjust in buoyancy without permanently altering the bobber or requiring an increase or decrease in the mass or weight of the bobber.

An additional object is to provide an adjustable buoyancy fishing bobber system that provides a method of easily and quickly attaching fishing line to the bobber.

A further object is to provide an adjustable buoyancy fishing bobber system that is configured to prevent water from entering within the bobber during use or when the bobber is underwater or on its side.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
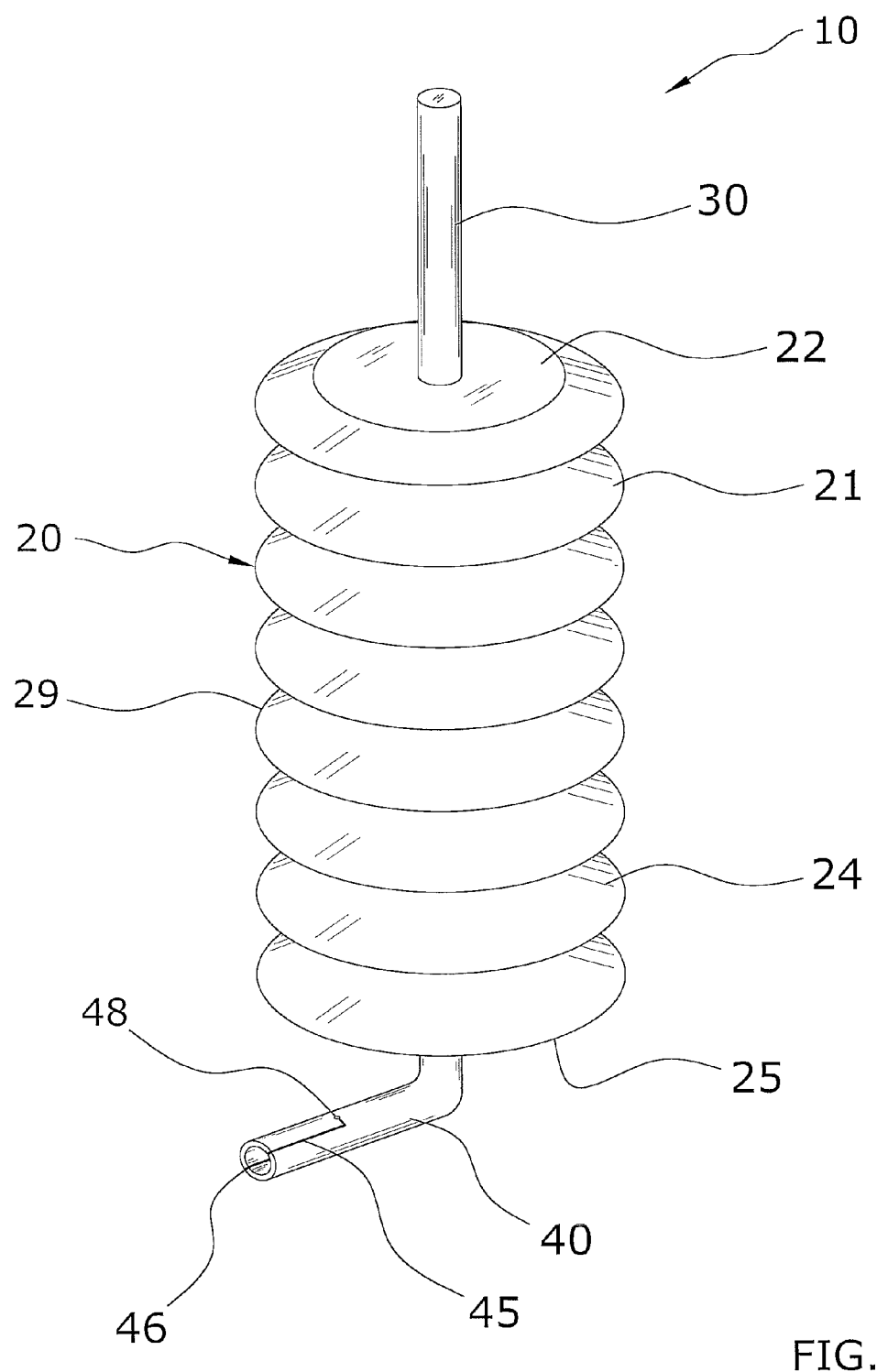
FIG. 1 is an upper perspective view of the present invention in an expanded position and thus maximizing the volume of the chamber to subsequently maximize the buoyancy of the present invention.
Figure 2:
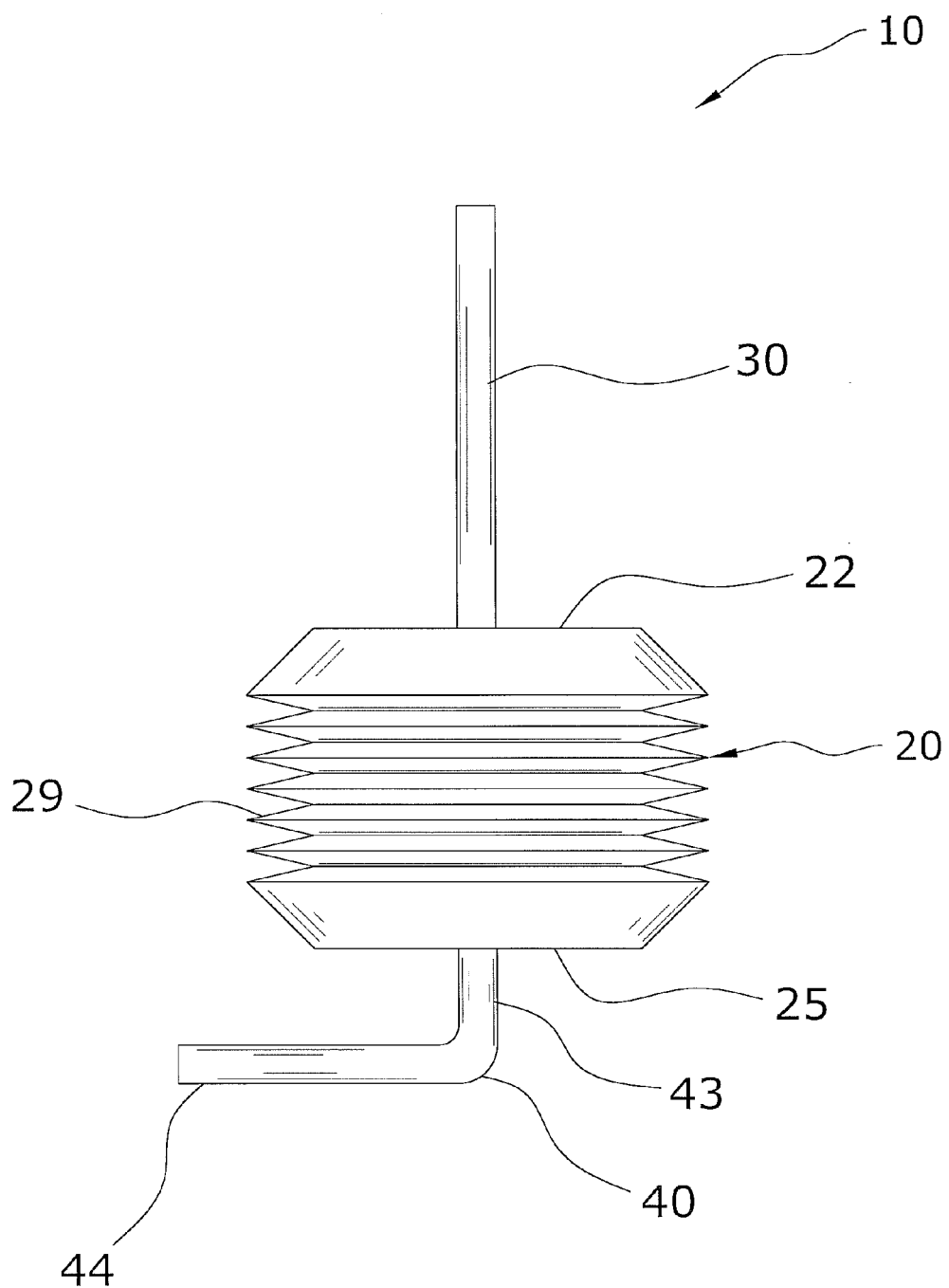
FIG. 2 is a side view of the present invention in a retracted position and thus minimizing the volume of the chamber to subsequently minimizing the buoyancy of the present invention.
Figure 3:
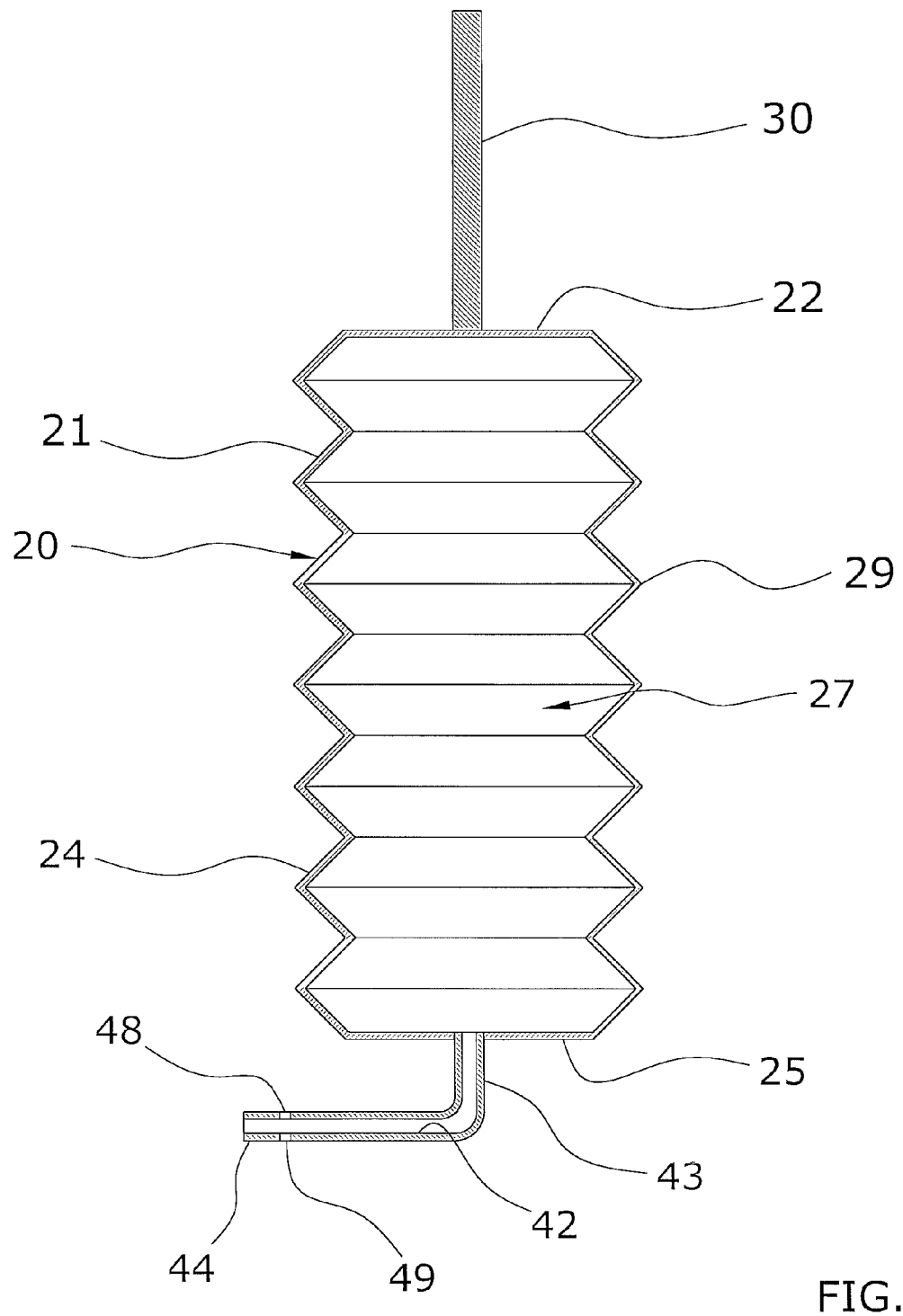
FIG. 3 is a longitudinal cross-sectional view of the present invention in an expanded position.
Figure 4:
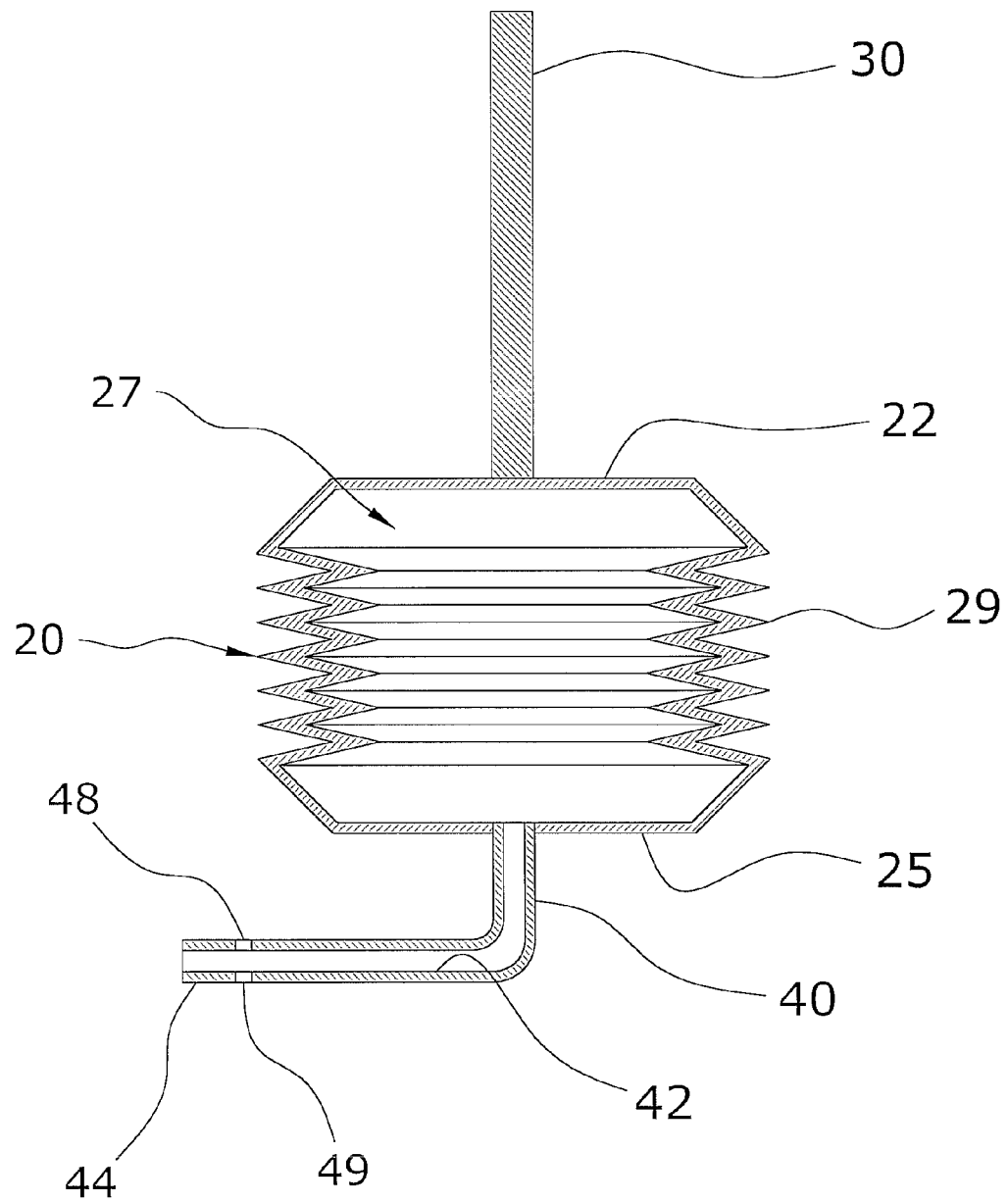
FIG. 4 is a longitudinal cross-sectional view of the present invention in a retracted position.
Figure 5:
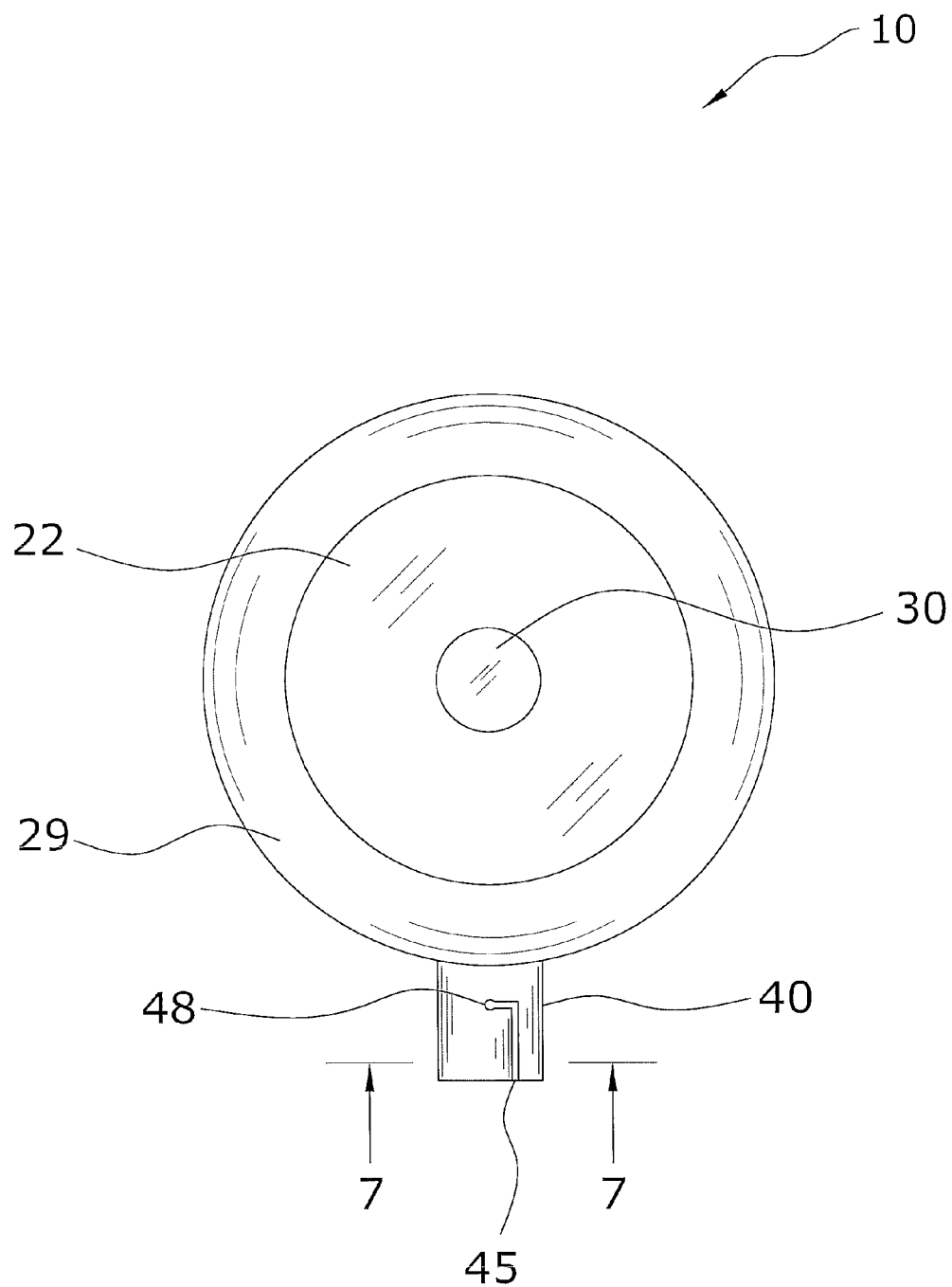
FIG. 5 is a top view of the present invention.
Figure 6:
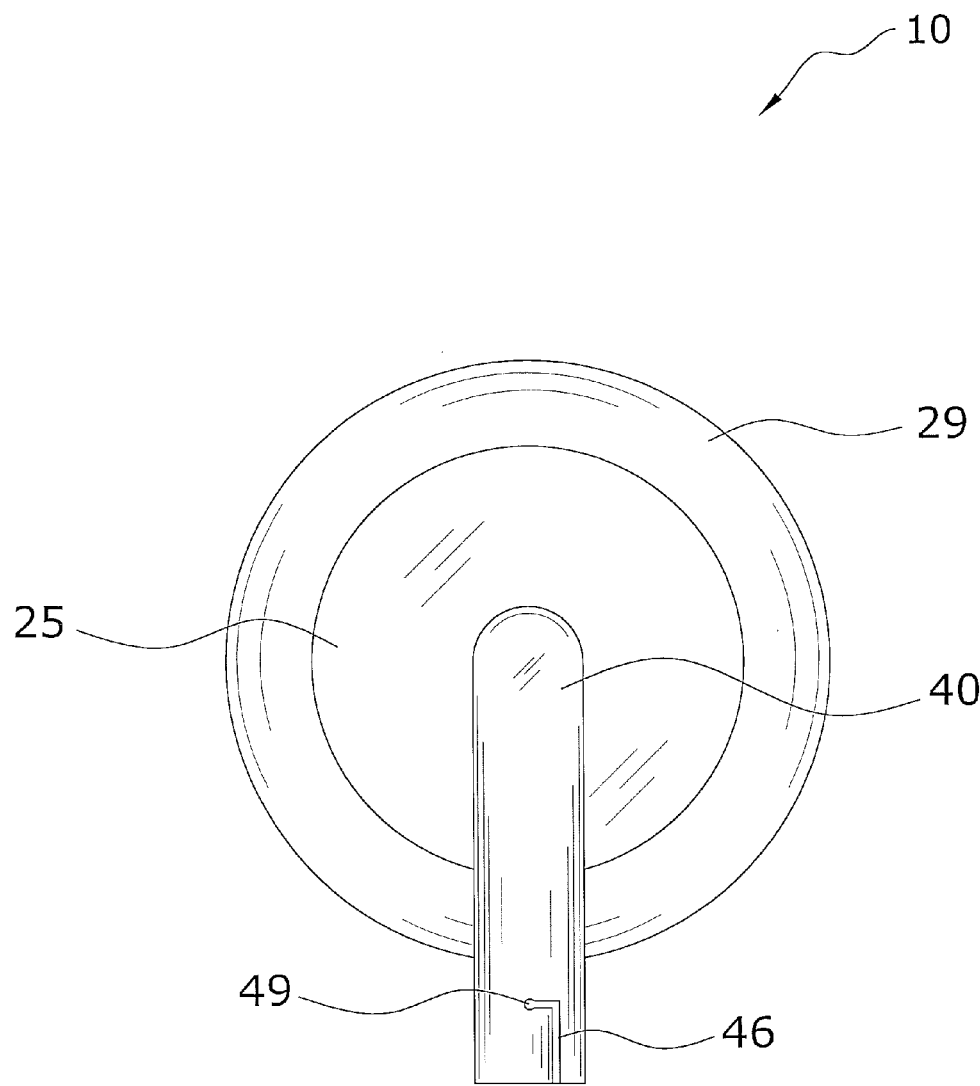
FIG. 6 is a bottom view of the present invention.
Figure 7:
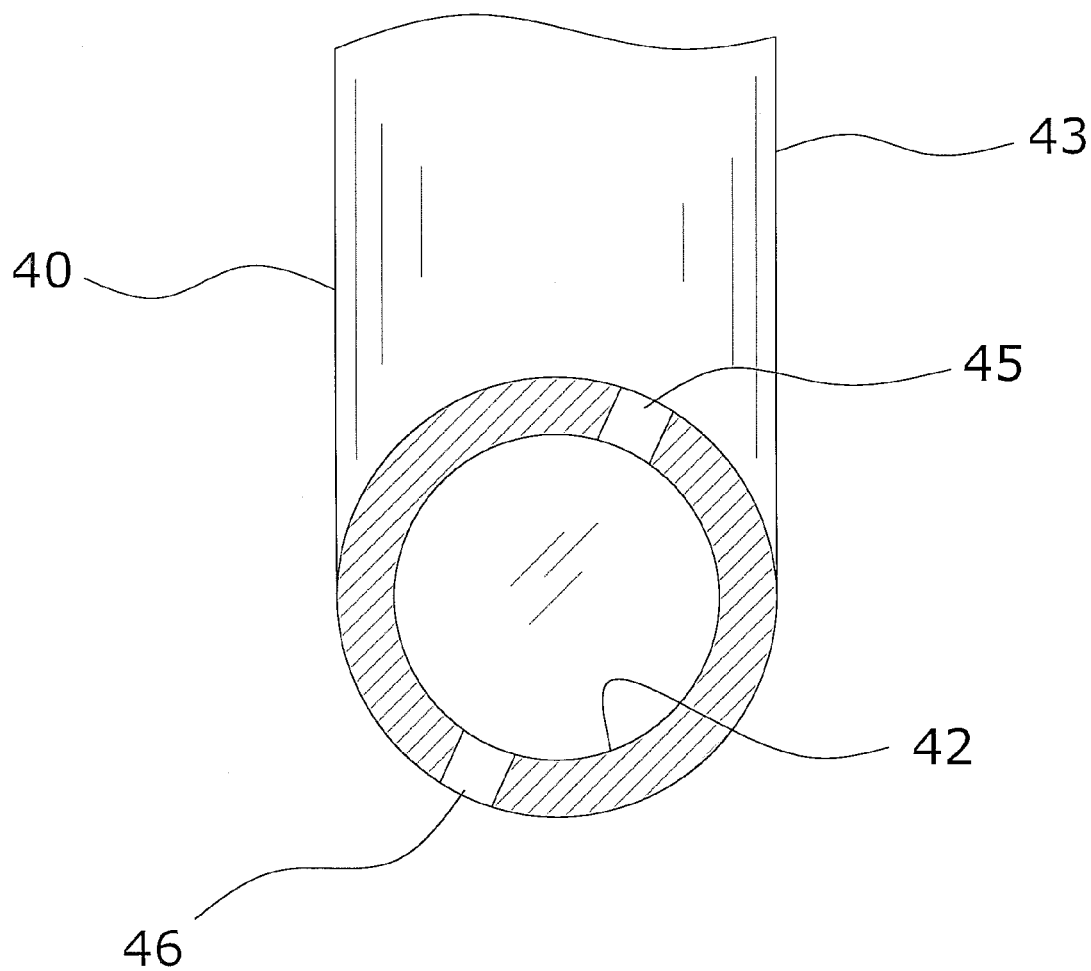
FIG. 7 is a sectional view taken along lines 7-7 of FIG. 5.
Figure 8:
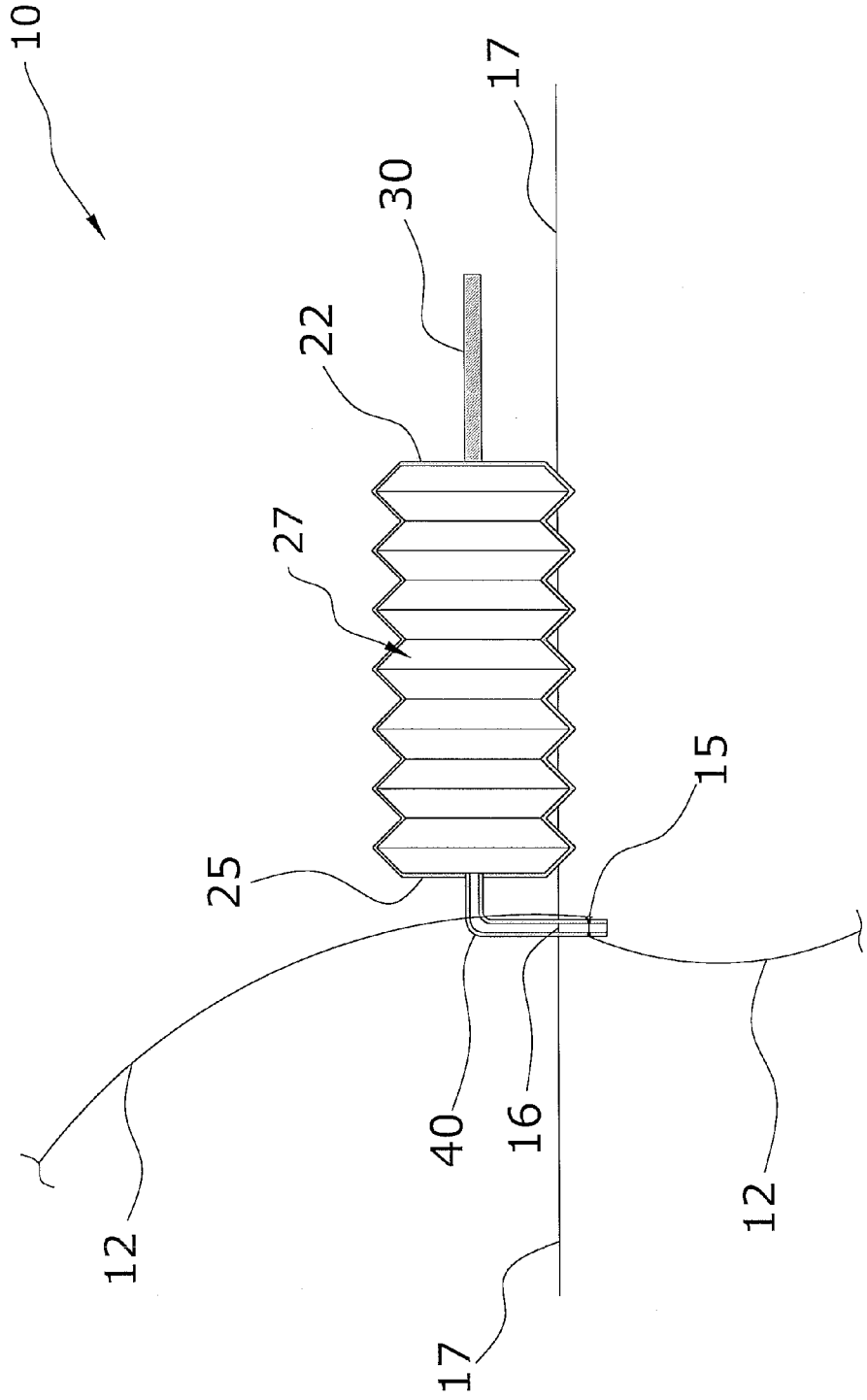
FIG. 8 is a longitudinal cross-sectional view of the present invention in an expanded position and illustrating the present invention turned on its side, wherein the L-shaped configuration of the vent prevents the water from entering within the chamber.
Figure 9:
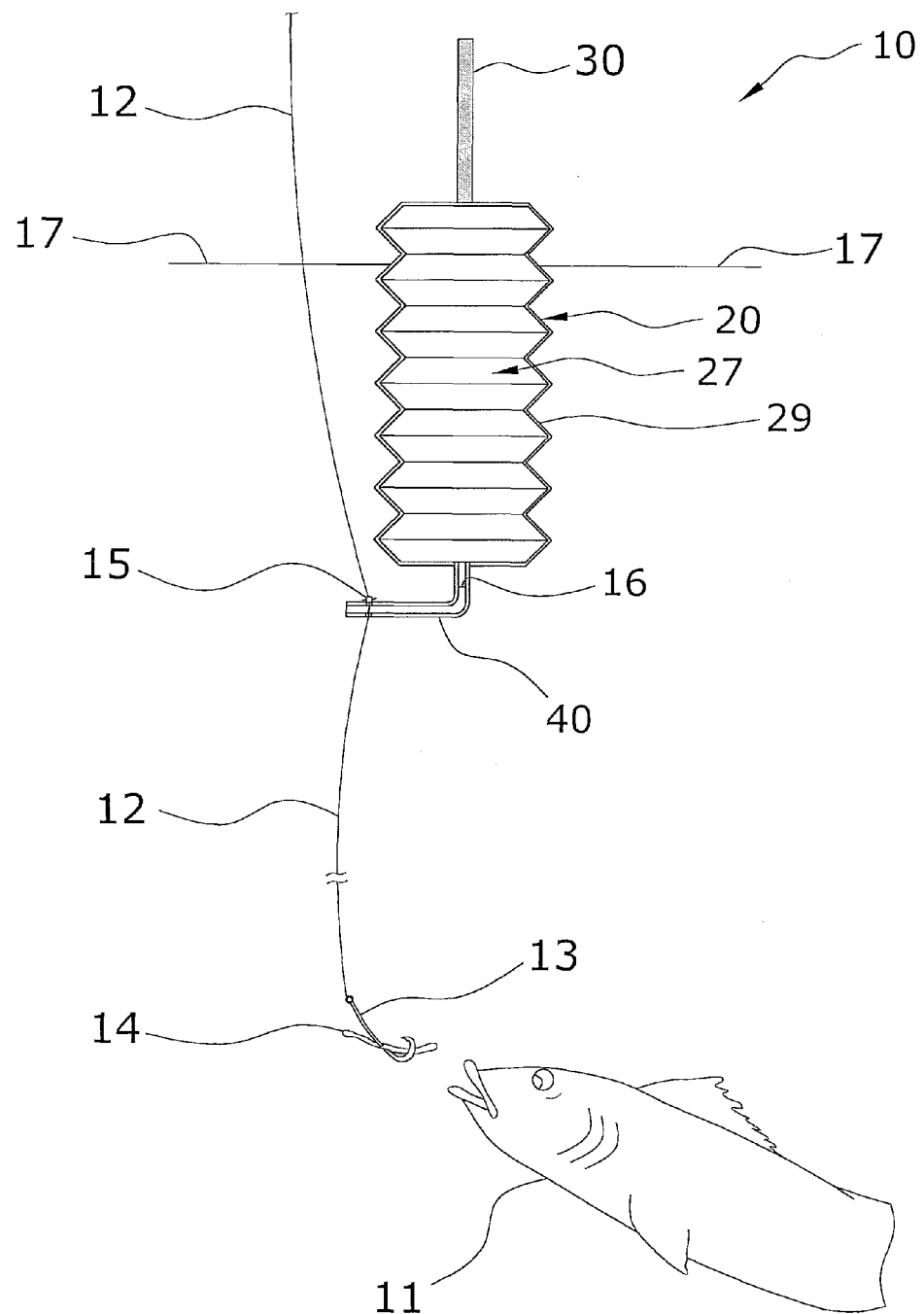
FIG. 9 is a longitudinal cross-sectional view of the present invention in an expanded position and illustrating the present invention in use, wherein the L-shaped configuration of the vent prevents the water from entering within the chamber.
Figure 10:
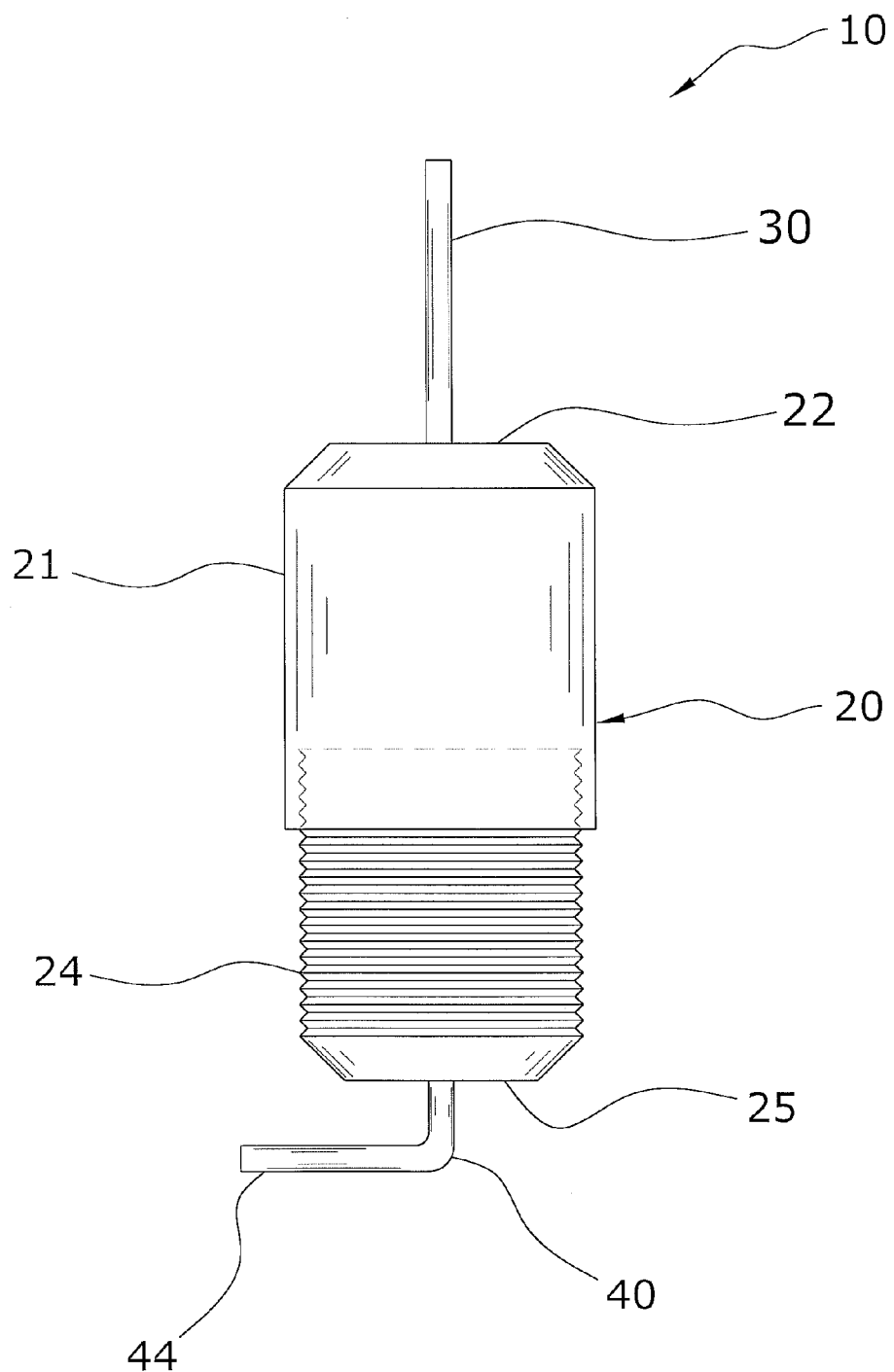
FIG. 10 is a side view of a first alternate embodiment of the present invention in an expanded position.
Figure 11:
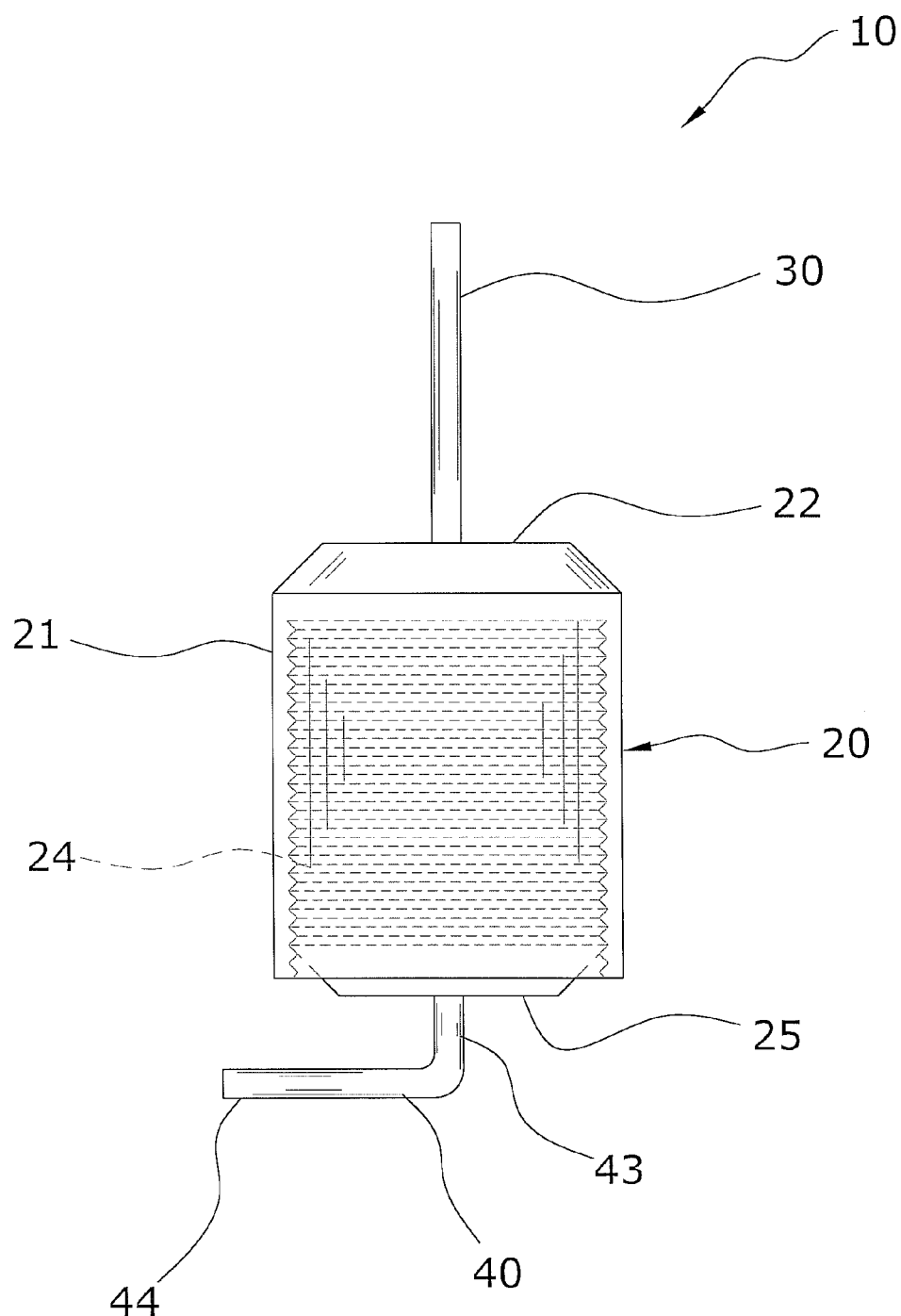
FIG. 11 is a side view of the first alternate embodiment of the present invention in a retracted position.
Figure 12:
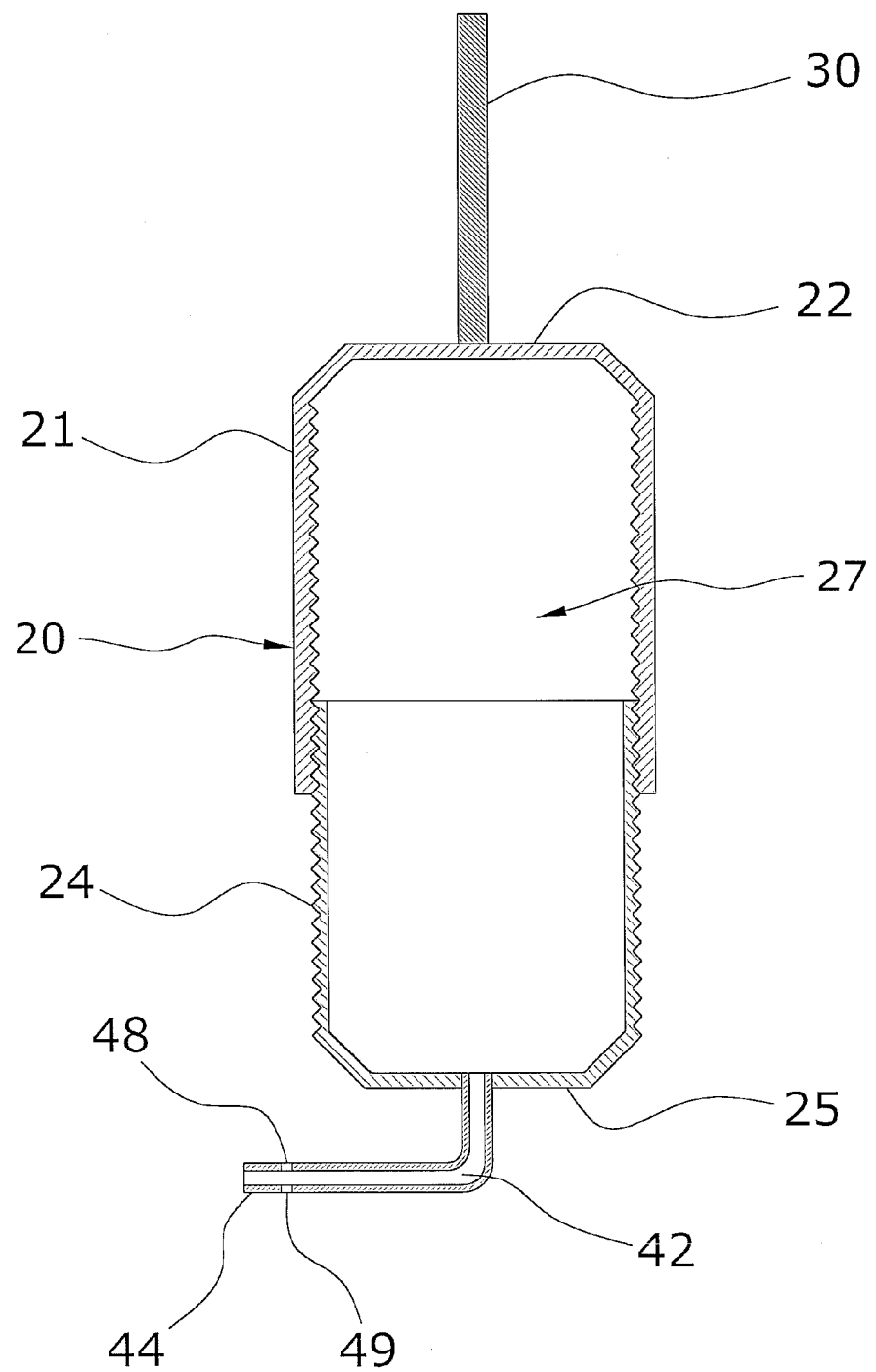
FIG. 12 is a longitudinal cross-sectional view of the first alternate embodiment of the present invention in an expanded position.
Figure 13:
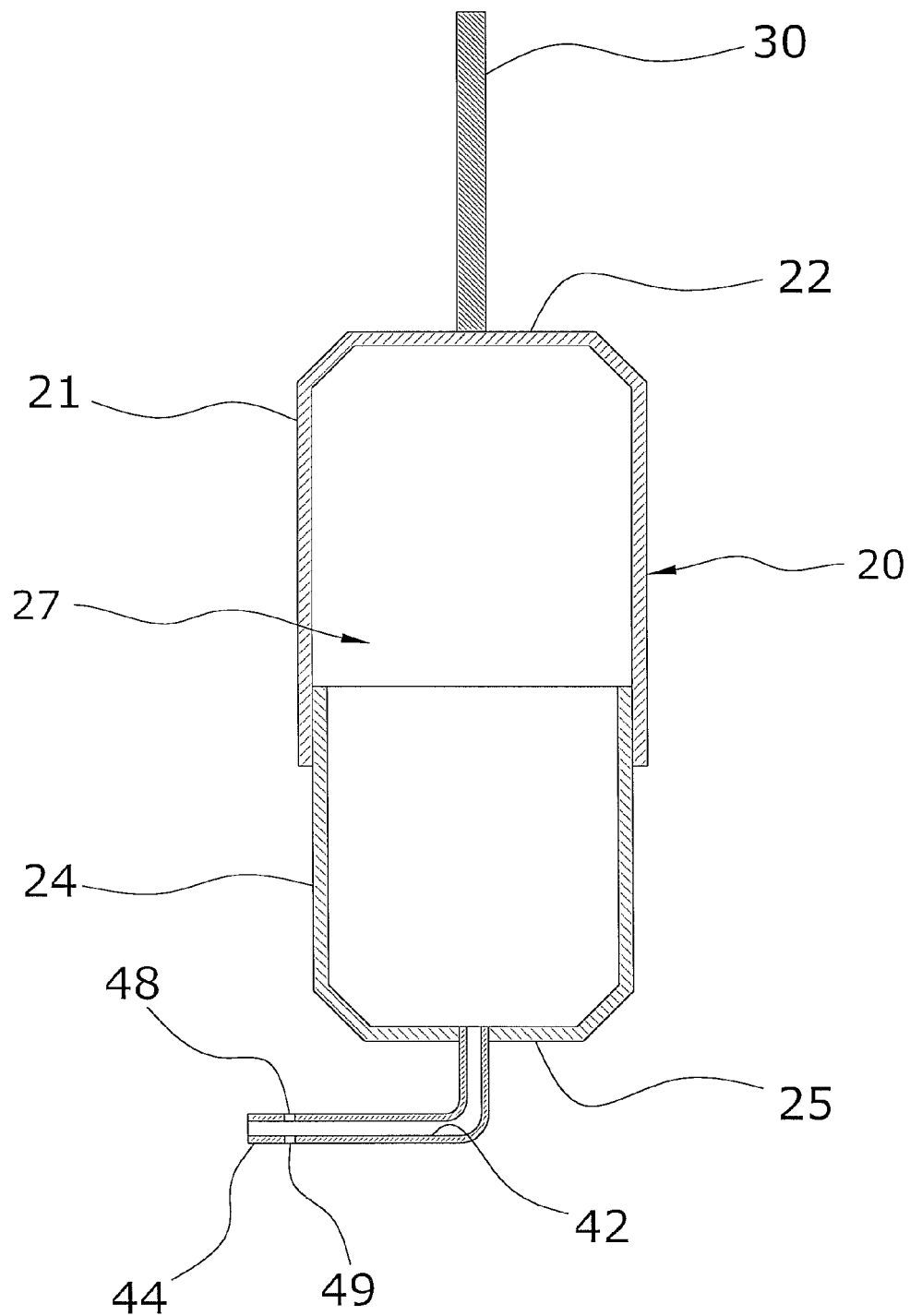
FIG. 13 is a longitudinal cross-sectional view of a second alternate embodiment of the present invention in an expanded position.
Figure 14:
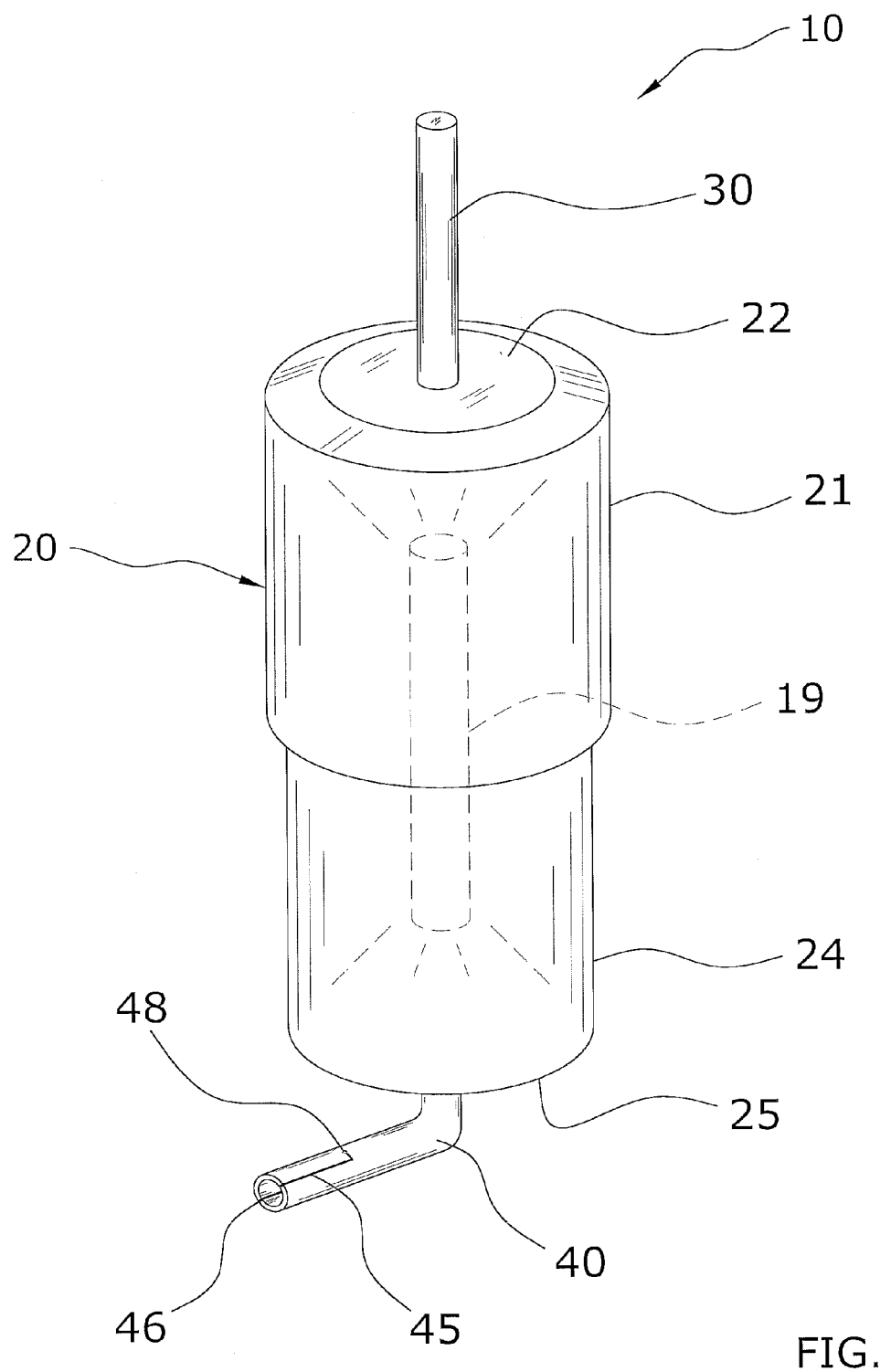
FIG. 14 is an upper perspective view of the second alternate embodiment of the present invention in an expanded position, wherein a glow stick is positioned within the chamber to luminate the casing.

Turning now descriptively to the drawings, in which similar reference characters denote similar elements throughout the several views, FIGS. 1 through 14 illustrate an adjustable buoyancy fishing bobber system 10, which comprises a casing 20 including a first portion 21 and a second portion 24, wherein the first portion 21 extends from the second portion 24, wherein the casing 20 includes a chamber 27 formed within the first portion 21 and the second portion 24. Adjusting the first portion 21 with respect to the second portion 24 adjusts a volume of air within the casing 20. A vent 40 including a channel 42 extends from the casing 20, wherein the channel 42 extends through vent 40 and fluidly connects to the chamber 27 of the casing 20 to allow the air from within the chamber 27 to escape or enter within the chamber 27 during adjusting.

B. Casing

The casing 20 of the present invention is able to expand and retract to adjust the buoyancy of the present invention and thus allow the present invention to accommodate a wider range of weight combinations of fishing gear (e.g. fishing line 12, lure 13, bait 14, etc.). The casing 20 is preferably comprised of a plastic or other type of material that may withstand extended exposure to water and various other outdoor elements. It is appreciated that the casing 20 is also comprised of a buoyant material. The casing 20 may be comprised of various shapes, such as but not limited to rectangular or cylindrical.

The casing 20 includes a first portion 21 and a second portion 24, wherein the second portion 24 longitudinally extends from the first portion 21. The first portion 21 and the second portion 24 expand or retract about each other to adjust the volume of an internal chamber 27 formed between the first end 22 of the first portion 21 and the second end 25 of the second portion 24. Adjusting the volume of the chamber 27 (i.e. via moving the first portion 21 about the second portion 24) subsequently adjusts the amount of air within the chamber 27 thus increasing or decreasing the buoyancy of the casing 20. It is important that the first portion 21 seals in a watertight manner about the second portion 24 to prevent water from entering within the chamber 27 between the first portion 21 and the second portion 24.

In the preferred embodiment of the present invention, the first portion 21 and the second portion 24 are integrally formed and preferably include a plurality of corrugations 29 encircling the first portion 21 and the second portion 24 to aid in the expanding and retracting of the first portion 21 about the second portion 24. It is appreciated that in alternate embodiments of the present invention, the first portion 21 and the second portion 24 may be comprised of separate structures and are preferably removable from one another. In a first alternate embodiment, the first portion 21 may threadably attach to the second portion 24 and likewise threadably adjust about the second portion 24. In the first embodiment, the first portion 21 preferably includes a plurality of internal threads and the second portion 24 includes a plurality of external threads.

In a second alternate embodiment the first portion 21 and the second portion 24 are also comprised of separate structures but have smooth outer and inner surfaces, wherein the first portion 21 and the second portion 24 adjust about each other in a compression manner. It is appreciated that a glow stick 19 may be positioned within the internal chamber 27 formed by the first portion 21 and the second portion 24 to aid in the visibility of the present invention. The casing 20 is subsequently preferably comprised of at least a slightly transparent configuration or a material in which the light emitted from the glow stick 19 may shine through.

C. Stabilizing Member

A stabilizing member 30 also preferably extends from the first portion 21 of the casing 20. The stabilizing member 30 is preferably comprised of an elongated configuration and may be comprised of various shapes (e.g. cylindrical, etc.). The stabilizing member 30 is also preferably concentric with the casing 20. The stabilizing member 30 is also preferably comprised of a substantially lightweight material so as to not cause the casing 20 to tip over upon its side during use.

D. Vent

A vent 40 preferably extends from the second portion 24 of the casing 20 opposite the stabilizing member 30. The vent 40 is preferably comprised of a hollow tube configuration, wherein the vent 40 includes a channel 42 longitudinally extending through the vent 40 and interconnecting with the chamber 27 of the casing 20. The air is able to enter and escape from within the chamber 27 through the channel 42 during the adjusting of the volume of air within the chamber 27. The vent 40 is preferably taken out of the water when adjusting the volume of air within the internal chamber 27. It is appreciated that when placing the vent 40 within the water, the water forms a seal over the outer end of the vent 40 to prevent the air from escaping from the chamber 27 through the channel 42.

The vent 40 is preferably comprised of an L-shaped configuration so as to prevent water from entering the chamber 27 through the channel 42. The vent 40 includes a connecting portion 43 extending from the second portion 24, wherein the connecting portion 43 is preferably concentric with the second portion 24. Extending from the connecting portion 43 is the extended portion 44. The extended portion 44 is preferably perpendicular to a longitudinal axis of the casing 20. The channel 42 preferably extends longitudinally through the connecting portion 43 and the extended portion 44.

The extended portion 44 of the vent 40 also preferably includes a first opening 48 and a second opening 49 for receiving the fishing line 12 and connecting the fishing line 12 to the present invention. The center axis of the first opening 48 and the second opening 49 are preferably concentric and are further preferably parallel to the longitudinal axis of the casing 20.

The center axis of the first opening 48 and the second opening 49 are also preferably offset from the center longitudinal axis of the casing 20. Offsetting the first opening 48 and the second opening 49 from the center longitudinal axis of the casing 20 assists in generating a rocking motion at the first end 22 of the casing 20 as the fishing line 12 is pulled downward.

The first opening 48 and the second opening 49 are further preferably offset at least a quarter or half of the casing 20 diameter from the center longitudinal axis of the casing 20. Offsetting the first opening 48 and the second opening 49 further ensures that the point of connection of the fishing line 12 and the first opening 48 and second opening 49 are below the water line 17 and thus not as subject to freezing during use in cold temperatures (i.e. ice fishing).

Extending from the first opening 48 and the second opening 49 are preferably a first slot 45 and a second slot 46 respectively. The first slot 45 and the second slot 46 are preferably comprised of similar configurations and further preferably mirror each other about a center longitudinal axis of the extended portion 44 of the vent 40. The first slot 45 and the second slot 46 are also preferably comprised of an L-shaped configuration.

The first slot 45 extends from the first opening 48 and through an outer end of the extended portion 44 of the vent 40. The second slot 46 likewise extends from the second opening 49 and through the outer end of the extended portion 44 of the vent 40. The first slot 45 and the second slot 46 are preferably comprised of a substantially similar or slightly greater width as the fishing line 12 and also comprised of a smaller width than the stopper 15. The first slot 45 and the second slot 46 are also preferably close to within a horizontal plane and thus perpendicular to the first opening 48 and the second opening 49.

E. Operation of Preferred Embodiment

In use, a typical arrangement for fishing using the present invention includes a lure 13 or hook and bait 14, fishing line 12 which is tied to the lure 13 and extends above the water line 17 of the water. A stopper 15 (i.e. bobber stop) is also preferably attached to the line 12 between the present invention and the fishing reel or rod. The stopper 15 prevents excess fishing line 12 from passing through the present invention. The fishing line 12 is simultaneously slid within the first slot 45 and the second slot 46, around the L-shape of the first slot 45 and the second slot 46 and within the first opening 48 and the second opening 49. The fishing line 12 may then freely travel through the first opening 48 and the second opening 49 until engagement of the stopper 15 upon the first opening 48 (i.e. closest opening to fishing reel or rod with respect to the fishing line 12).

When cast into the water the lure 13 and bait 14 sink until the fishing line 12 passes through the present invention, wherein the stopper 15 prevents additional line 12 from passing. Assuming the lure 13 is not resting on the floor surface of the body of water, the present invention provides a buoyant force to suspend the lure 13 and bait 14 in the water. In order for the present invention to be partially exposed above the water line 17 the buoyant force of the present invention must be equal to or greater than the sum of the downward forces of the fishing line 12 weight between the present invention and lure 13, the lure 13 weight, the bait 14 weight, and the weight of the present invention itself.

When a fish 11 takes the lure 13 and bait 14 the additional force causes the present invention to be submerged indicating a "strike". It is desired that the buoyant force be minimal such that the fish 11 does not notice additional resistance when it takes the lure 13 and bait 14. Therefore it is desired to have the present invention designed to provide minimal buoyant force prior to a "strike". The present invention allows for correction of the buoyancy force by either increasing or decreasing the overall length and corresponding volume of the chamber 27 within the casing 20 (i.e. via adjusting the first portion 21 about the second portion 24) to obtain the ideal buoyancy force.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. An adjustable buoyancy fishing bobber system, comprising:
    a casing including a first portion and a second portion, wherein said first portion extends from said second portion;
    wherein said casing includes a chamber formed within said first portion and said second portion; and
    a vent including a channel extending through said vent, wherein said vent extends from said casing and wherein said channel of said vent is fluidly connected to said chamber;
    wherein said vent includes at least one opening extending through a side wall of said vent transverse said channel for connecting a fishing line to said vent;
    wherein adjusting said first portion with respect to said second portion adjusts a volume of air within said casing.

2. The adjustable buoyancy fishing bobber system of claim 1, wherein said vent is comprised of an L-shaped configuration.

3. The adjustable buoyancy fishing bobber system of claim 1, wherein a center axis of said at least one opening is parallel to said center longitudinal axis.

4. The adjustable buoyancy fishing bobber system of claim 1, wherein said at least one opening is offset from a center longitudinal axis of said casing.

5. The adjustable buoyancy fishing bobber system of claim 4, wherein said casing includes an outer diameter, wherein said at least one opening is offset at least a quarter of a length of said outer diameter from said center longitudinal axis.

6. The adjustable buoyancy fishing bobber system of claim 1, wherein said vent includes least one slot extending from said at least one opening through an outer end of said vent.

7. The adjustable buoyancy fishing bobber system of claim 6, wherein said at least one slot is comprised of an L-shaped configuration.

8. The adjustable buoyancy fishing bobber system of claim 1, wherein said first portion and said second portion include a plurality of corrugations.

9. The adjustable buoyancy fishing bobber system of claim 1, wherein said first portion threadably attaches to said second portion.

10. The adjustable buoyancy fishing bobber system of claim 1, wherein said first portion slidably attaches to said second portion.

11. An adjustable buoyancy fishing bobber system, comprising:
  a casing including a first portion and a second portion, wherein said first portion extends from said second portion;
  wherein said casing includes a chamber formed within said first portion and said second portion;
  wherein adjusting said first portion with respect to said second portion adjusts a volume of air within said casing; and
  a vent including a channel extending through a side wall of said vent transverse said channel said vent, wherein said vent extends from said casing and wherein said channel of said vent is fluidly connected to said chamber; wherein said vent is comprised of an L-shaped configuration;
  wherein said vent includes at least one opening extending through a side wall of said vent transverse said channel and wherein said at least one opening is offset from a center longitudinal axis of said casing.

12. The adjustable buoyancy fishing bobber system of claim 11, wherein a center axis of said at least one opening is parallel to said center longitudinal axis of said casing.

13. The adjustable buoyancy fishing bobber system of claim 11, wherein said casing includes an outer diameter, wherein said at least one opening is offset at least a quarter of a length of said outer diameter from said center longitudinal axis.

14. The adjustable buoyancy fishing bobber system of claim 11, wherein said vent includes at least one slot extending from said at least one opening through an outer end of said vent.

15. The adjustable buoyancy fishing bobber system of claim 11, wherein said at least one slot is comprised of an L-shaped configuration.

16. The adjustable buoyancy fishing bobber system of claim 11, wherein said first portion and said second portion include a plurality of corrugations.

17. The adjustable buoyancy fishing bobber system of claim 11, wherein said first portion threadably attaches to said second portion.

18. The adjustable buoyancy fishing bobber system of claim 11, wherein said first portion slidably attaches to said second portion.

19. An adjustable buoyancy fishing bobber system, comprising:
  a casing including a first portion and a second portion, wherein said first portion extends from said second portion;
  wherein said casing includes a chamber formed within said first portion and said second portion;
  wherein adjusting said first portion with respect to said second portion adjusts a volume of air within said casing; and
  a vent including a channel extending through said vent, wherein said vent extends from said casing and wherein said channel of said vent is fluidly connected to said chamber;
  wherein said vent is comprised of an L-shaped configuration;
  wherein said vent includes at least one opening extending through said vent, wherein a center axis of said at least one opening is parallel to a center longitudinal axis of said casing;
  wherein said at least one opening is offset from said center longitudinal axis of said casing;
  wherein said casing includes an outer diameter, wherein said at least one opening is offset at least a quarter of a length of said outer diameter from said center longitudinal axis;
  wherein said vent includes at least one slot extending from said at least one opening through an outer end of said vent;
  wherein said at least one slot is comprised of an L-shaped configuration.

* * * * *